Patented Aug. 13, 1946

2,405,702

UNITED STATES PATENT OFFICE 2,405,702

PROCESS FOR PREPARING PYRANTHRONE

Henry R. Lee, Pitman, and Joseph Deinet and Hans B. Gottlieb, Glassboro, N. J., assignors to E. I. du Pont de Nemours & Company, Wilmington, Del., a corporation of Delaware No Drawing. Application May 23, 1944,
Serial No. 536,986

1 Claim. (Cl. 260—360)

This invention relates to an improvement in the process for preparing pyranthrone, and more particularly to a process whereby crude 2,2'-dimethyl-1,1'-dianthraquinonyl, which has been prepared from a crude 1-halogen-2-methylanthraquinone, is condensed directly to pyranthrone without purification of the intermediates.

The 1-halogen-2-methylanthraquinone, which is prepared by the halogenation of 2-methylanthraquinone as such or as it is ring-closed from the methylorthobenzoyl benzoic acid, is always contaminated with large amounts of isomeric methyl-halogenanthraquinone compounds, and, more particularly, the 2-halogen-3-methylanthraquinone. In the preparation of the 2,2'-dimethyl-1,1'-dianthraquinonyl, it has therefore been necessary to purify the 1-chloro-2-methylanthraquinone prior to condensation, and, after condensation to the dianthraquinonyl, a further purification of the dianthraquinonyl was required, for the methods heretofore employed for effecting ring-closure of the 2,2'-dimethyl-1,1'-dianthraquinonyl made it advisable to employ very pure dianthraquinonyl. Even after these purifications, the overall yields of pyranthrone were not satisfactory, so that it has generally been found more advantageous to produce the pyranthrone starting with the 1-nitro-2-methylanthraquinone which is converted first to the 1-amino-2-anthraquinone, then, after diazotization, to the dianthraquinonyl compound.

It is an object of the present invention to provide a process for preparing pyranthrone directly from the crude 1-halogen-2-methylanthraquinone, which process will give the pyranthrone directly in good yields without requiring purification of the dye intermediate employed or produced in the reaction. It is a further object of the invention to provide a process for the preparation of pyranthrone starting from the crude dye intermediates by a process which does not involve further purification steps, and which produces the pyranthrone of a quality equal to the commercial pyranthrone of today's standards.

We have found that pyranthrone of standard quality can be obtained directly from the crude 1-halogen-2-methylanthraquinone, where the crude 2,2'-dimethyl-1,1'-dianthraquinonyl containing even as high as 50% of uncondensed isomeric halogenmethylanthraquinones is used with phenol and alkali metal hydroxide. With crude 2,2'-dimethyl-1,1'-dianthraquinonyl containing up to 25% of 3-halogeno-2-methylanthraquinone as impurity, our new fusion is more economical than standard commercial methods. In this fusion, the dimethyldianthraquinonyl is ring-closed to pyranthrone while the isomeric halogenmethylanthraquinone, which may be considered, in the main, the 2-halogen-3-methylanthraquinone, is converted to the 2-phenoxy-3-methylanthraquinone or isomeric products, which phenoxy derivatives are readily removed from the pyranthrone by simple dilution of the reaction mass with ethyl alcohol or by extraction of the pyranthrone, after filtration, with other organic solvents. As an alternative method of separating out the relatively pure pyranthrone, the reaction mass may be filtered after extraction with water and dissolved in concentrated sulfuric acid at room temperature, after which it is drowned in water, filtered, and washed acid-free. This latter process appears to sulfonate the phenoxy derivative, rendering it water-soluble, whereby it is readily removed from the pyranthrone by filtration and washing with water.

The following examples are given to illustrate the invention. The parts used are by weight.

Example 1

One part of well powdered crude 2,2'-dimethyl-1,1'-dianthraquinonyl, containing 25% of 3-bromo-2-methylanthraquinone as an admixture, was gradually added with agitation to a melt of 1.8 parts of caustic potash in 4.7 parts of phenol at 115° C. during the course of 15 minutes. The temperature of the agitated mass was then raised, kept first at 125° C. for 0.5 hour and later at 140° to 145° C. for 3.5 hours. The mass was drowned into 10 parts of water and aerated at 90° C. for the oxidation of the leuco pyranthrone for 3 hours. The product was collected, extracted with 10 parts of 3% caustic soda, washed free from phenol with dilute caustic, then freed from alkali with hot water and dried. The resulting powdered mixture was extracted with 5 parts of nitrobenzene at 130° C. for 0.5 hour, was filtered at 100° to 110° C., washed with ethanol to remove the nitrobenzene, and dried. All of the 3-phenoxy-2-methylanthraquinone had been removed by nitrobenzene. Pure pyranthrone was obtained in 95% yield, based on the 2,2'-dimethyl-1,1'-dianthraquinonyl contained in the original crude quinonyl.

Example 2

One part of a well powdered crude 2,2'-dimethyl-1,1'-dianthraquinonyl, containing 20% of 3-bromo-2-methylanthraquinone as chief admixture, was charged at 125° C. into an agitated melt of 2 parts of caustic potash and 4 parts of phenol.

The temperature of the fusion was raised and the mixture stirred for 4 hours at 145° to 150° C.

After cooling to 110° C., 4 parts of ethanol were added with agitation and the whole filtered at 70° C. The filter cake was washed with 8 parts of ethanol and finally with hot water until free from alkali and bromide. The yield of pure pyranthrone amounted to 96%–99%, based on 2,2'-dimethyl-1,1'-dianthraquinonyl contained in the original crude quinonyl.

3-phenoxy-2-methyl-anthraquinone is readily isolated from the phenolic-alcoholic mother liquor.

Example 3

The starting material used in this instance was a crude quinonyl containing 40% of 3-chloro-2-methylanthraquinone as the principal admixture. This product was subjected to phenol-caustic potash fusion under the conditions described in Example 2 for the crude quinonyl containing bromo product. The fusion was worked up in an identical manner with Example 2 and pure pyranthrone was isolated in good yield, based on 2,2'-dimethyl-1,1'-dianthraquinonyl contained in the original crude quinonyl.

Example 4

One part of a well powdered crude 2,2'-dimethyl-1,1'-dianthraquinonyl, containing 20% of 3-bromo-2-methylanthraquinone, was charged at 125° C. into an agitated melt of 2 parts of caustic soda and 4 parts of phenol. The temperature of the agitated fusion was brought to 150° C. and kept at 150° to 152° C. for 4 hours.

The melt was worked up as described in detail in Example 2. Pure pyranthrone was obtained in good yield, based on 2,2'-dimethyl-1,1'-dianthraquinonyl contained in the original crude quinonyl.

Example 5

One part of a well powdered crude 2,2'-dimethyl-1,1'-dianthraquinonyl, containing 5% of 3-bromo-2-methylanthraquinone, was charged at 125° C. into an agitated mass of 2 parts of caustic potash and 4 parts of phenol. The fusion was heated to 145° to 150° C. for 4 hours, allowed to cool, and drowned into 15 parts of water. The mass was filtered, the cake extracted with dilute caustic, washed free from phenol and alkali, and dried. This crude pyranthrone was purified and converted into dye paste in one step. The finely powdered crude was dissolved in 8 to 10 parts of concentrated sulfuric acid and agitated at room temperature for 2 hours. In this treatment the admixed 3-phenoxy-2-methylanthraquinone was completely sulfonated and remained dissolved, when the sulfuric acid solution was drowned into water for the preparation of the dye paste. The resulting pyranthrone was of excellent shade and strength.

It is of course understood that the above examples are given merely to illustrate the invention, and that various modifications of the same are possible without departing from the spirit of this invention. The ratio of the phenol to the crude dimethyldianthraquinonyl and the ratio of the caustic to the phenol, or the duration of the fusion, may be varied within reasonable limits. The temperatures, likewise, may be varied, it being understood, of course, that with too low a temperature the reaction becomes too slow to be practical. Temperatures greatly in excess of those given in the examples, however, are not required.

The phenoxymethylanthraquinone impurities produced during the fusion, more particularly the 3-phenoxy-2-methylanthraquinone, may be removed from the pyranthrone by using solvents other than alcohol or nitrobenzene. Orthodichlorobenzene, or any other solvent in which this material is preferentially soluble, may of course be employed.

It will be obvious that the phenol may be substituted by other hydroxybenzenes, such as, for instance, cresols or commercial mixtures of the same.

This process has a very important technical advantage over the previously known processes in that the pyranthrone can be obtained directly and without recrystallization from impure 2,2'-dimethyl-1,1'-dianthraquinonyl, which, in turn, was obtained from the very impure 1-halogen-2-methylanthraquinone without isolation or purification of the intermediates. If such impure dimethyldianthraquinonyl is ring-closed directly by the usual alcoholic caustic fusion methods, the resulting pyranthrone gives dull and unsatisfactory dyeings, and expensive and time-consuming recrystallization of such product is required to give a dye of satisfactory purity. On the other hand, if the pyranthrone of satisfactory purity were to be obtained starting with impure 1-halogen-2-methylanthraquinone, the purification of the resulting dimethyldianthraquinonyl requires large crystallization losses and materially reduces the yield of the resulting pyranthrone, based on the original starting material. By the present invention, the pyranthrone is formed directly and need only be washed from by-products, using suitable solvents, which simple operation involves no substantial loss of the pyranthrone itself.

We claim:

The process for preparing a relatively pure pyranthrone from an impure 2,2'-dimethyl-1,1'-dianthraquinonyl containing substantial amounts of 2-halogen-3-methylanthraquinones, which comprises fusing the crude 2,2'-dimethyl-1,1'-dianthraquinonyl with a phenol and an alkali metal hydroxide, diluting the fusion mass with ethyl alcohol, filtering off the pyranthrone, and washing the resulting pyranthrone cake with alcohol and with water.

HENRY R. LEE.
JOSEPH DEINET.
HANS B. GOTTLIEB.